United States Patent [19]
Caffo et al.

[11] Patent Number: 5,737,636
[45] Date of Patent: Apr. 7, 1998

[54] METHOD AND SYSTEM FOR DETECTING BYPASS ERRORS IN A LOAD/STORE UNIT OF A SUPERSCALAR PROCESSOR

[75] Inventors: David George Caffo; Christopher Anthony Freymuth, both of Austin, Tex.

[73] Assignee: International Business Machines Corporation, Armonk, N.Y.

[21] Appl. No.: 591,249

[22] Filed: Jan. 18, 1996

[51] Int. Cl.$^6$ .................................................. G06F 13/16
[52] U.S. Cl. ..................... 395/874; 395/875; 395/873; 395/471
[58] Field of Search ......................... 395/874, 875, 395/473, 471, 381

[56] References Cited

U.S. PATENT DOCUMENTS

| | | | |
|---|---|---|---|
| 4,747,043 | 5/1988 | Rodman | 395/451 |
| 4,773,041 | 9/1988 | Hassler et al. | 395/421.03 |
| 4,991,090 | 2/1991 | Emma et al. | 395/185.03 |
| 5,185,871 | 2/1993 | Frey et al. | 395/381 |
| 5,214,770 | 5/1993 | Ramanujan et al. | 395/450 |
| 5,247,626 | 9/1993 | Firoozmand | 395/200.07 |
| 5,313,609 | 5/1994 | Baylor et al. | 395/448 |
| 5,379,379 | 1/1995 | Becker et al. | 395/250 |
| 5,450,564 | 9/1995 | Hassuer et al. | 395/485 |

*Primary Examiner*—Tod R. Swann
*Assistant Examiner*—J. Peikari
*Attorney, Agent, or Firm*—Sawyer & Associates; Mark E. McBurney

[57] ABSTRACT

A load queue is provided in a load/store unit of a superscalar processor that includes a real page number buffer for storing a real page number for each instruction entry in the load queue. The load queue also includes a real page number comparator coupled to the real page number buffer for comparing executing load instruction entries with queued load instruction entries in the load queue. The load queue further includes a cache line modified register coupled to the data cache. The cache line modified register marks the queued load instruction entries when a cache line of the data cache addressed by the queued load instruction entry has been modified. In a preferred embodiment, when the executing load instruction is out of program order with respect to one of the queued load instructions, and the modified cache line register has marked the queued load instruction, the load queue signals a sequencer unit to cancel the queued load instruction. The load queue further includes an instruction identification buffer coupled to a sequencer unit for storing an instruction identifier for each entry in the load queue and a program order comparator coupled to the instruction identification buffer. The program comparator compares the ordering of instruction entries in the load queue with the executing load or store instruction.

14 Claims, 8 Drawing Sheets

| PROGRAM ORDER | ACTION/COMMAD | ADDRESS | CYCLE EXECUTED |
|---|---|---|---|
| 1 | LOAD | 1 | 1 |
| 3 | LOAD | 2 | 2 |
| | CACHE DATA MODIFY | 3 | 3 |
| 2 | LOAD | 3 | 4 |

| INSTRUCTION<br># Instr-address: | ACTION: | LOAD QUEUE OPERATION: |
|---|---|---|
| 1 Load-A | GET DATA FROM AI | ADD LOAD 1 TO QUEUE |
| 3 Load-B | GET DATA FROM BI | ADD LOAD 3 TO QUEUE |
| — | MODIFY CACHE LINE WITH BLAND C1 IN IT. | MARK LOAD 3 IN QUEUE AS MODIFIED |
| 2 Load-C-SAME CACHE LINE AS B | GET NEW DATA FROM CI | DETECT ERROR FOR LOAD 3 BECAUSE NEW DATA WAS READ FOR LOAD 2 |

FIGURE 8

METHOD AND SYSTEM FOR DETECTING BYPASS ERRORS IN A LOAD/STORE UNIT OF A SUPERSCALAR PROCESSOR

FIELD OF THE INVENTION

The present invention relates to superscalar processors, and more particularly to out-of-order execution within a load/store unit of a superscalar processor.

BACKGROUND OF THE INVENTION

In the continuing development of faster and more powerful computer systems, a significant microprocessor has been utilized, known as a reduced instruction set computer (RISC) processor. Increased advances in the field of RISC processors have led to the development of superscalar processors. Superscalar processors, as their name implies, perform functions not commonly found in traditional scalar microprocessors. Included in these functions is the ability to execute instructions out-of-order with respect to the program order. Although the instructions occur out-of-order, the results of the executions appear to have occurred in program order, so that proper data coherency is maintained.

While out-of-order execution is typically known to increase processor performance, certain problems exist that restrict the use of out-of-order execution under some circumstances. Included in these problems are coherency issues for a system's data cache.

For example, when executing load instructions out-of-order with respect to one another, two load instructions may address the same data cache location, causing false data to be received. Thus, when a later load instruction bypasses an earlier load instruction, the earlier load instruction may get newer data than it should have received based on the original program order. Such problems are commonly referred to as bypass errors. A key function for maintaining proper processor performance, therefore, is the detection of such bypass errors and correction in response to these bypass errors.

Accordingly, a need exists that allows effective detection and correction of bypass errors within a superscalar processor without decreasing performance.

SUMMARY OF THE INVENTION

Accordingly, the present invention meets these needs and provides a method and system for bypassing in a load/store unit. In a method aspect for detecting bypass errors in a load/store unit of a superscalar processor, the load/store unit including a load queue, the load queue including at least one load instruction entry, the method comprises comparing a real page number of an executing load instruction and a real page number of a queued load instruction. The method further includes comparing a program order of the executing load instruction and the queued load instruction when the real page numbers match, determining whether a bit for the queued load instruction has been set when the program order comparison indicates that the queued load instruction has been executed out-of-order with respect to the executing load instruction, and cancelling the queued load instruction when the bit has been set.

In a further aspect, the bit is a modified cache line bit. Additionally, the method further includes re-executing the cancelled queued load instruction. Further, the method includes comparing a real address of a modified cache line to a real address of each load instruction entry in the load queue, and setting the bit for each load instruction entry having a real address that resides within the modified cache line.

In a system aspect of the present invention, a load queue in a load/store unit of a superscalar processor includes a real page number buffer for storing a real page number for each instruction entry in the load queue, and a real page number comparator coupled to the real page number buffer for comparing executing load instructions with queued load instruction entries in the load queue. A cache line modified register coupled to the data cache is further included. The cache line modified register marks queued load instruction entries when a cache line of the data cache addressed by the queued load instruction entry has been modified.

In addition, the load queue includes an instruction identification buffer coupled to the sequencer unit for storing an instruction identifier for each entry in the load queue, and a program order comparator coupled to the instruction identification buffer for comparing ordering of instruction entries in the load queue with respect to the executing load instruction.

In yet another aspect of the present invention, a method for maintaining data coherency in an out-of-order execution of load instructions includes detecting a bypass error condition to a word boundary for a first load instruction executing out-of-order with respect to at least one second load instruction, and cancelling the second load instruction when the bypass error condition is detected in order to maintain data coherency.

An advantage of the present invention is the determinations of bypass errors for loads executing out-of-order with respect to other loads are performed to the level of the word boundary. The utilization of the real page number and snoop real address data in the load queue provides efficient and effective detection of such bypass errors. In this way, coherency of data is maintained, while improving system performance by allowing the out-of-order execution to proceed with reduced risk of errors, and thus eliminating the need to force load instruction execution according strictly to program order.

These and other advantages of the aspects of the present invention will be more fully understood in conjunction with the following detailed description and accompanying drawings.

DETAILED DESCRIPTION

The present invention relates to detection and correction of bypass errors in a superscalar processor. The following description is presented to enable one of ordinary skill in the art to make and use the invention and is provided in the context of a patent application and its requirements. Various modifications to the preferred embodiment and the generic principles and features described herein will be readily apparent to those skilled in the art.

It should be appreciated that the present invention is described herein in terms of a superscalar processor that allows out-of-order execution within and across functional units of a superscalar processor. One suitable such processor is the PowerPC™620, to be available from IBM Corporation, Austin, Tex. Although the description refers to the functions of this processor, the features of the present invention may be used with other similar processors that require the same types of detection and correction capabilities. Accordingly, the following is to be considered descriptive and not restrictive of the present invention.

Figure 1:
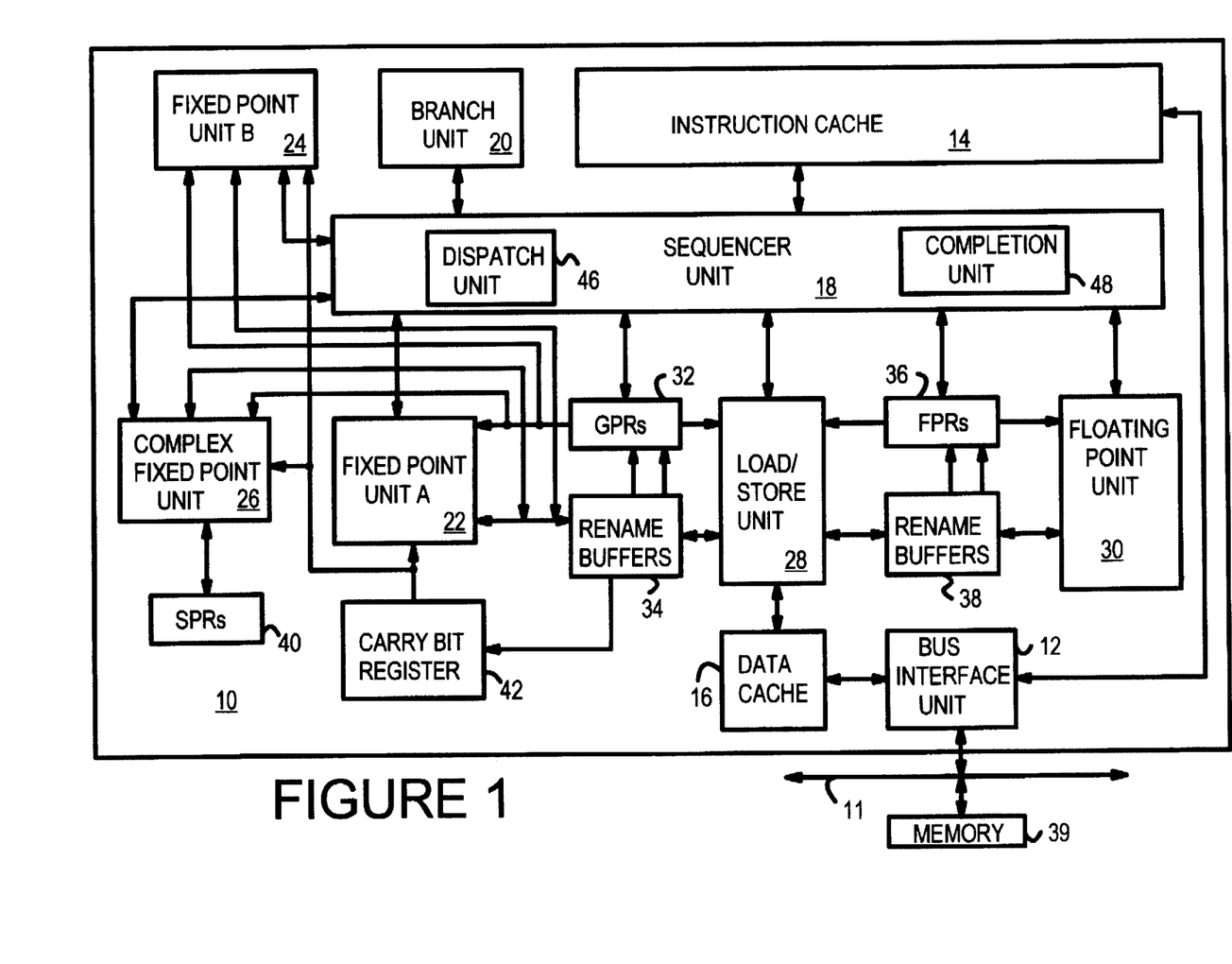
FIG. 1 illustrates a block diagram of a computer system in accordance with the present invention.

An overall block diagram of such a superscalar processor is shown in FIG. 1. As shown, superscalar processor systems typically include a system bus 11 connected to a bus interface unit ("BIU") 12 of a processor 10. BIU 12 controls the transfer of information between processor 10 and system bus 11. BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40. FPU 30 inputs its source operand information from floating point architectural registers ("FPRs") 36 and floating point rename buffers 38. FPU 30 outputs results (destination operand information) of its operation for storage at selected entries in floating point rename buffers 38. A further description of the processor 10 is suitably included in co-pending U.S. patent application Ser. No. 08/537,586, filed Oct. 2, 1995, entitled A Method and System for Performance Monitoring through Identification of Frequency and Length of Time of Execution of Serialization Instructions in a Processing System, and assigned to the assignee of the present invention.

In a superscalar processor, such as the PowerPC™620, five basic cycles occur for instruction processing. These five cycles include fetch, dispatch, execution, finish, and completion. For purposes of the present invention, a fetch cycle preferably refers to instruction fetch from an instruction cache; a dispatch cycle preferably refers to instruction dispatch to execution units; an execution cycle preferably refers to execution of the instruction; a finish cycle preferably refers to signalling the end of the instruction execution; and a completion cycle preferably refers to the architectural completion of the instruction. More particularly, a finish cycle preferably refers to the receipt of data from a main memory subsystem and made available to other functional units, while a completion cycle refers to the commitment of data to be architecturally written back to a register.

Figure 2:
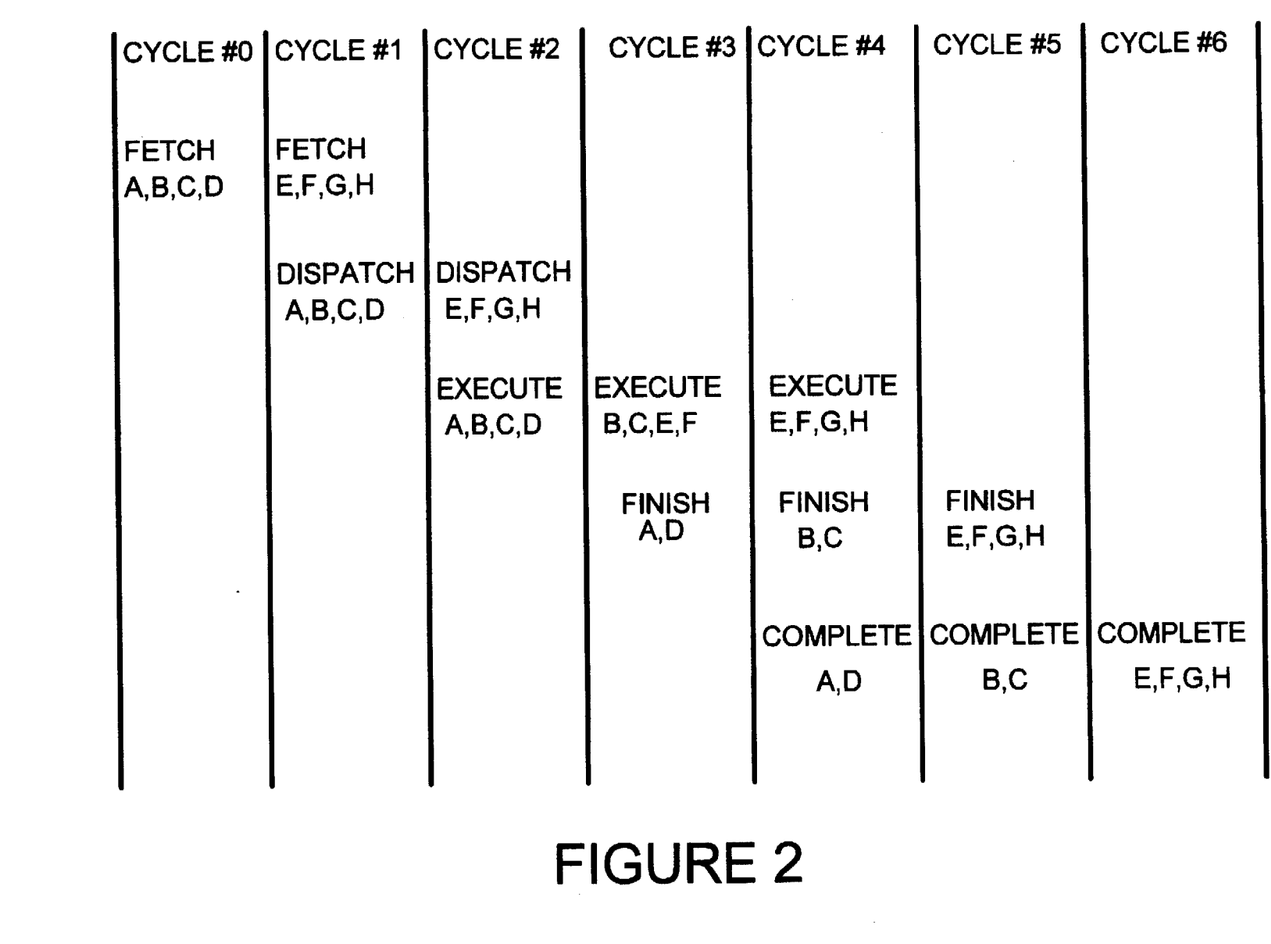
FIG. 2 illustrates a basic timing diagram of five instruction cycles.

As shown in FIG. 2, a basic timing diagram illustrates these five instruction cycles, as applied to a four-dispatch type of processor. By way of example, a fetch cycle occurs in cycle 0 for an instruction set 1, comprising instructions "A", "B", "C", and "D", while a fetch cycle for instruction set 2, comprising instructions "E", "F", "G", and "H", occurs in cycle 1. Also during cycle 1, a dispatch cycle occurs for instruction set 1. During cycle 2, instruction set 2's dispatch cycle occurs, while an execution cycle for instruction set 1 occurs.

During cycle 3, another execution cycle occurs for instructions "B", and "C", of instruction set 1, since these instructions suitably represent two-cycle instructions. For the PowerPC™620, two examples of two-cycle instructions are load instructions and store instructions. Cycle 3 is also a finish cycle for instructions "A" and "D" of instruction set 1. For instruction set 2, instructions "E" and "F" are also two-cycle instructions, so cycle 3 is a first execution cycle for these instructions.

For instructions "A" and "D", cycle 4 is a completion cycle, and a finish cycle for instructions "B" and "C". Further, cycle 4 is an execution cycle for instruction set 2. Cycle 5 is then a finish cycle for instruction set 2, and is a completion cycle for instructions "B" and "C". Cycle 6 concludes the diagram as a completion cycle for instruction set 2.

As illustrated by this diagram, dispatches occur variable number of cycles prior to execution. The number of cycles occurring is dependent upon dependencies between instructions and execution latencies in the execution unit, as is well appreciated by those skilled in the art. Accordingly, instructions need to be held in an instruction queue, known as a reservation station, in each execution unit until the execution unit and all the operands for the instructions are available. Similarly, although only a single cycle is shown as occurring between the finish and completion cycles in the diagram of FIG. 2, several cycles may actually occur between the time an instruction finishes execution and the time it can be architecturally completed. Thus, queues are needed to hold instructions awaiting completion. Two such queues in a load/store execution unit are the load queue and the finished store queue. A further queue suitably exists to hold completed stores until the cache is able to accept the data for the store and is preferably known as the completed store queue.

Figure 3:
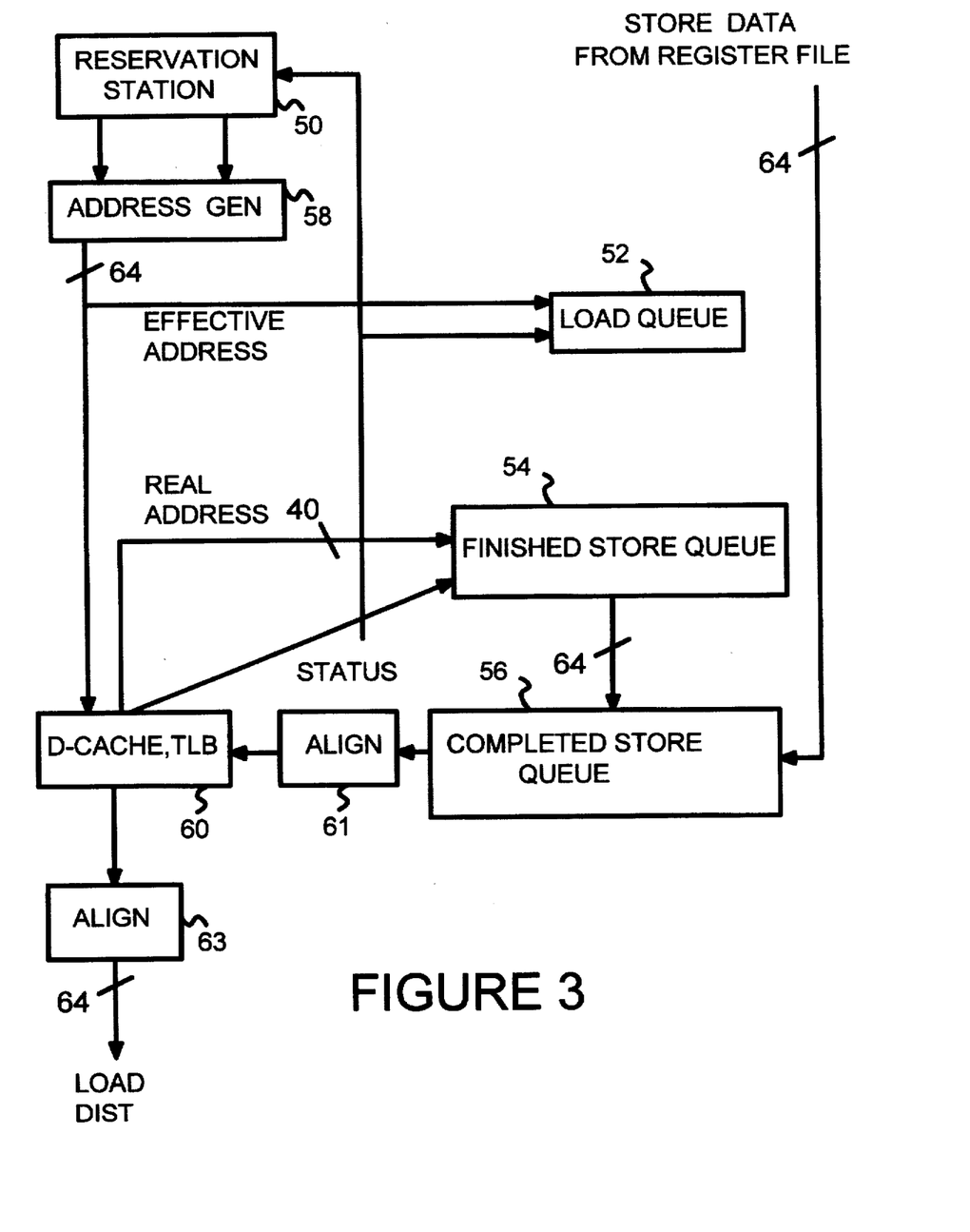
FIG. 3 illustrates a block data flow diagram within a load/store unit.

FIG. 3 illustrates a block data flow diagram of the relationship among a reservation station 50, a load queue 52, a finished store queue 54 and a completed store queue 56. An address generator 58 generates a 64 bit effective address from the current instruction in the reservation station 50. The page offset which is the 12 least significant bits of the effective address is received by the load queue 52. The data cache 60 receives all 64 bits of the effective address. The data cache 60 generates a real page number that is received by the finished store queue 54, and also generates a plurality of status bits that are received by the finished store queue 54, the load queue 52, and the reservation station 50. The status bits preferably reflect coherency and other cache status information. Other components are illustrated in the diagram, including align units 61 and 63, the details of the functions of which are well understood by those skilled in the art and are not included in the present discussion.

Figure 4:
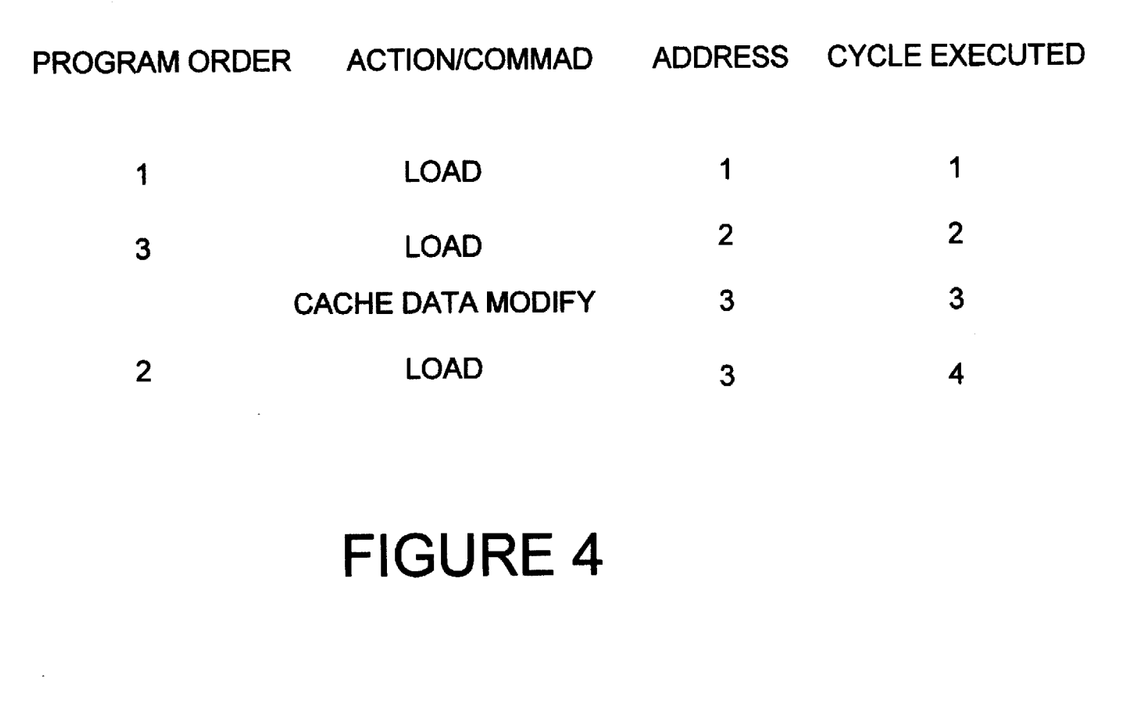
FIG. 4 represents an instruction sequence with out-of-order load instructions.

These queues 52, 54, and 56 in the load/store unit preferably handle situations in which load or store instructions bypass other load or store instructions. For example, FIG. 4 represents a series of load instructions that execute out-of-order. As shown, a third load instruction accessing address 2 executes a cycle prior to a second load instruction accessing address 3 even though the third load instruction is supposed to occur after the second load instruction according to the program order. Assuming that both the second and third load instructions address the same cache line, the cache modify data occurring during cycle 3 causes the second load instruction to get new data and the third load instruction to get old data. However, according to the program order, the third load instruction should occur after the second load instruction and thus also get the new data. Such bypass errors preferably are not allowed if the loads access the same data and are suitably corrected by re-executing the third load instruction so that it gets the new data.

Figure 5:
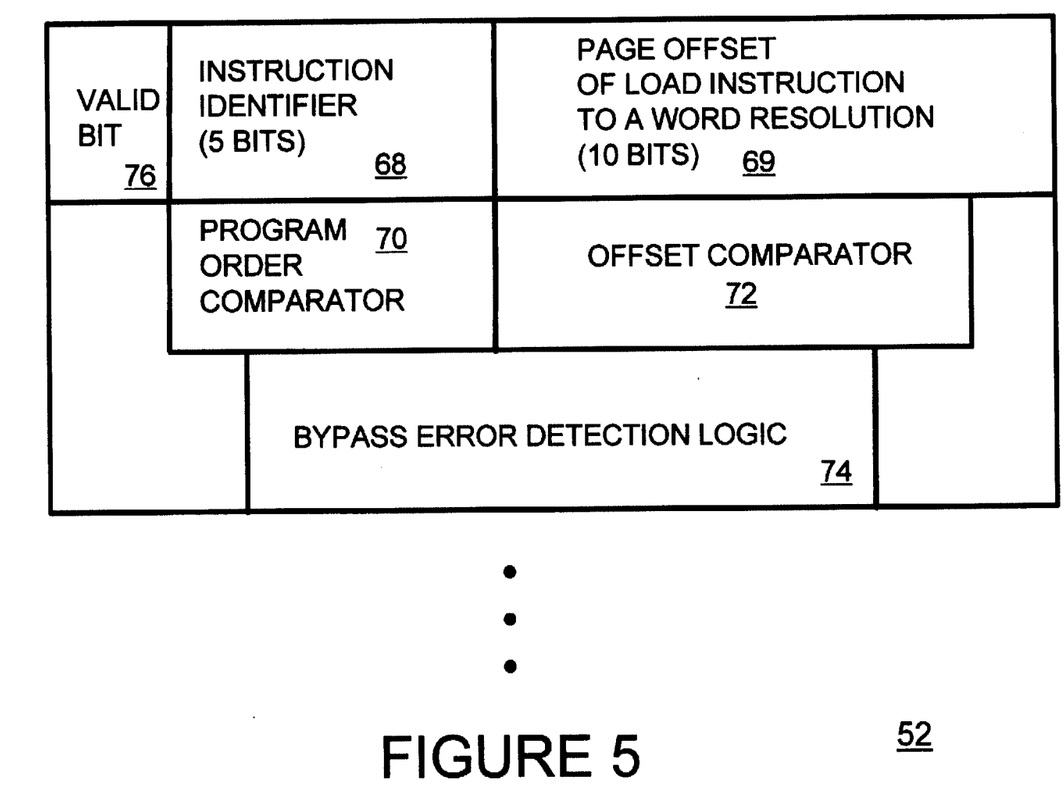
FIG. 5 illustrates a block diagram of a load queue.

FIG. 5 illustrates a block diagram of load queue 52 that tags load instructions appropriately to indicate which load instructions executing out-of-order have received old data. Preferably, the load queue 52 holds all loads that have been executed until each load is completed and its data transferred to a register file in order to detect a bypass condition. For each load queue entry, an instruction identifier buffer 68, e.g., five bits wide, holds the instruction identifier from the effective address, and a page offset buffer 69, e.g., 10 bits wide, stores the address of the offset within a cache page for the load data, as received from the effective address from the address generator 58 (FIG. 4). Further, the load queue 52 includes a program order comparator 70, an offset comparator 72, and bypass error detection logic 74.

Comparators 70 and 72 with the detection logic 74 are suitably able to compare all the loads in the load queue against an executing load or store to determine if a bypass error has occurred and if a load instruction needs re-executing. The valid bit 76 preferably indicates that the data stored in the queue is valid. The valid bit 76 is utilized to qualify the validity of the compare.

Unfortunately, with the load queue arrangement of FIG. 5, the accuracy of detection is limited by the comparisons being done. Thus, the resolution of the offset comparator limits detection to only the page offset of the executing load or store. Also, there is no ability to detect if 'snooping' of a cache line has occurred. For purposes of this discussion, 'snooping' preferably refers to monitoring addresses driven by a bus master, e.g., in a multiprocessor system, to detect the need for coherency actions. Thus, a bypass error may go undetected if snooping occurs, or may be detected on the same page offset event though the load instructions do not access the same cache line of data within the page. In such situations, false detects may occur causing reexecution of loads unnecessarily which wastes processor time and reduces performance.

Figure 6:
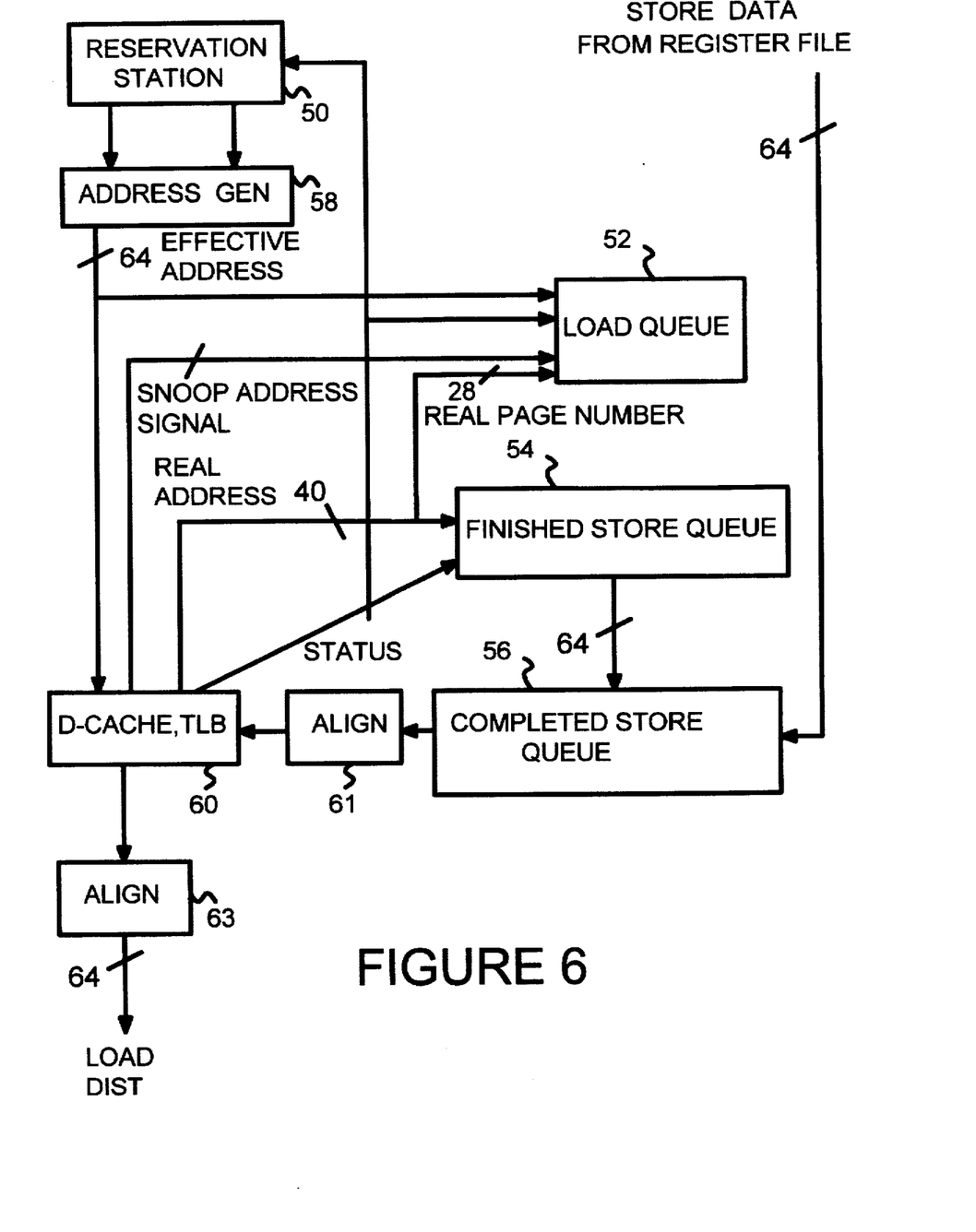
FIG. 6 illustrates a modified block data flow diagram of FIG. 3 in accordance with the present invention.
Figure 7:
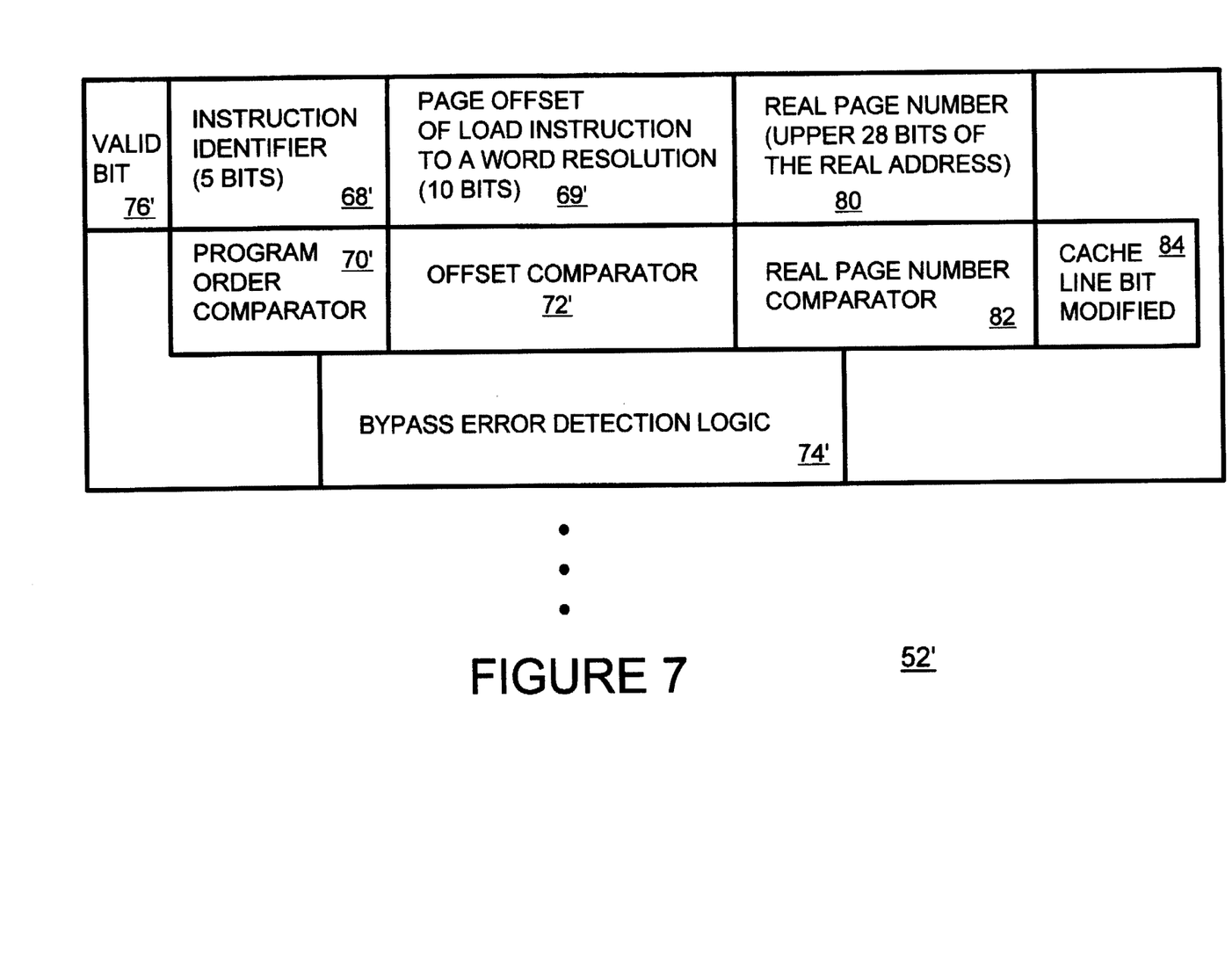
FIG. 7 illustrates a modified load queue of FIG. 5 in accordance with the present invention.

In accordance with the present invention, FIGS. 6 and 7 illustrate a modified block data flow diagram of FIG. 3, and a modified load queue of FIG. 5, respectively, that allow for improved detection of a load bypassing a load. As shown in FIG. 6, in which like components to FIG. 3 are labelled similarly, a load queue 52' receives a real page number, e.g. 28 bits wide, from the real address from the data cache 60. The real address is supplied by the data cache 60 when a load instruction finishes executing and is stored in the load queue 52'. The data cache 60 further supplies a snoop real address signal (from the BIU 12, FIG. 1) to the load queue 52' when a snoop occurs.

As shown in FIG. 7, the load queue 52' includes a buffer 80 for storing the real page number. The load queue 52' further includes a real page number comparator 82 for comparing the real page numbers of each entry in the load queue. When the data cache 60 modifies a line of data, the real address of the line being modified is compared against all other real addresses stored in the real address buffer 80. When there is a match, the matching load entry is marked via the cache line modified register 84, e.g., a one bit storage element.

Figure 8:
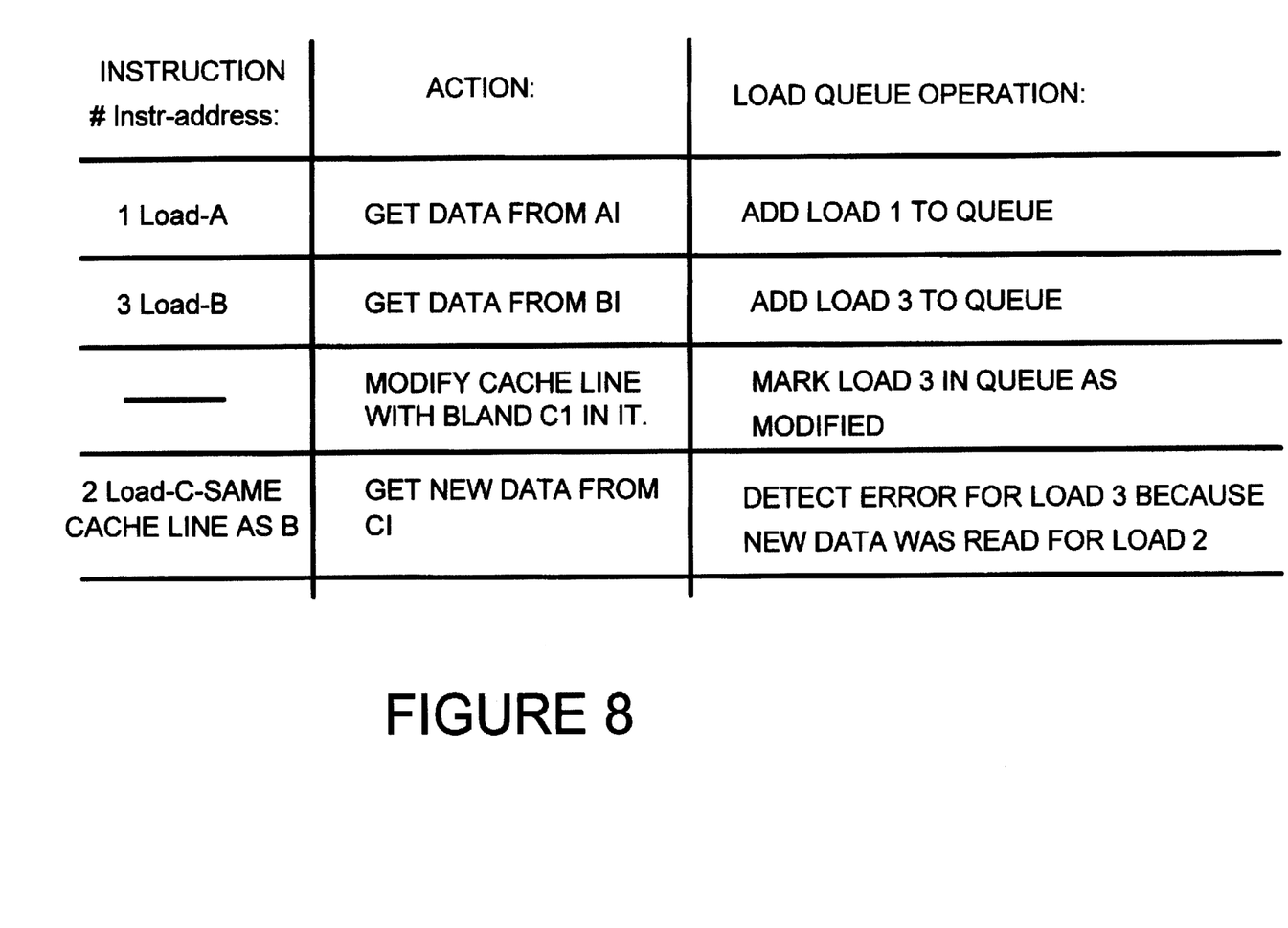
FIG. 8 illustrates an instruction sequence exemplifying bypass error detection in accordance with the present invention.

By way of example, FIG. 8 illustrates an instruction sequence during which improved detection of a bypass error occurs in accordance with the present invention. During the instruction sequence of FIG. 8, one load bypasses another load, and the two loads access the same cache line. As shown, a load B1 instruction is executing out-of-order with respect to a load C1 instruction, since the program order shows that the load B1 was third, while the load C1 was second. As the sequence occurs, for the load A1 instruction, the action performed is a load of the data from the address A1. The load A1 instruction is added as an entry in the load queue 52'. For the load B1 instruction, the data from address B1 is received, and the load B1 instruction is added as an entry in the load queue 52'. A modification of a cache line occurs next.

For purposes of illustration, the modified cache line includes the addresses of B1 and C1, and thus, the data accessed in both the load B1 and load C1 instructions may have been modified. The load queue entry of load B1 is then suitably marked as modified, e.g., the cache line modified bit 84 is set to a high logic level. The setting of the cache line modified bit 84 provides a clear indication that a load risks a bypass error due to some event in the cache line it addresses. Preferably, the setting of the modified bit in each entry of the load queue results from a match occurring from a comparison of the real address of the cache line being modified with the real addresses of each load instruction entry in the load queue 52'.

When load C1 then executes, the data cache 60 returns the real address of the load as well as the new data from the modified cache line. Since the real address of the executing load C1 instruction matches the real address of the queued load B1 instruction to the word boundary, as determined by the offset comparator 72 and real page number comparator 82, the program order of the two instructions are compared in the program order comparator 70. Since the load C1 instruction is out-of-order with respect to the queued load B1 instruction, a determination of whether the cache line modified bit 84 of the queued load B1 instruction is made. Since the bit is at a high logic level, a bypass error is detected and the queued load B1 instruction is cancelled and re-executed to avoid having load C1 get newer data than load B1. Thus, data coherency is efficiently and accurately maintained for the instruction sequence.

The example of FIG. 8 demonstrates the need to check against the cache line boundary for load/load bypass errors. In a system with shared memory, another bus master could have changed the data in the cache line regardless of whether the processor has modified the cache line. Without detecting the modification of the cache line for the load B1 instruction in the above example, newer data would have been received before older data as far as the program order is concerned.

Thus, the present invention allows determinations of bypass errors for loads executing out-of-order with respect to other loads to the level of the cache line boundary. The utilization of the real page number and snoop real address data in the load queue provides efficient and effective detection of such bypass errors. In this way, coherency of data is maintained, while improving system performance by allowing the out-of-order execution to proceed with reduced risk of errors, and thus eliminating the need to force load instruction execution according strictly to program order.

Although the present invention has been described in accordance with the embodiments shown, one of ordinary skill in the an will recognize that there could be variations to the embodiment and those variations would be within the spirit and scope of the present invention. For example, although the completed store queue and finished store queue are illustrated as separate queues, they may be formed as one queue in some systems when the functionality of the two queues is maintained. Accordingly, many modifications may be made by one of ordinary skill without departing from the spirit and scope of the present invention, the scope of which is defined by the following claims.

We claim:

1. A load queue in a load/store unit of a superscalar processor, the load queue, coupled to a data cache, an address generator, and holding one or more load instruction entries, the load queue comprising:

a real page number buffer for storing a real page number for each instruction entry in the load queue;

a real page number comparator coupled to the real page number buffer for comparing executing load or store instructions with queued load instruction entries in the load queue; and a cache line modified register coupled to the data cache, the cache line modified register for marking queued load instruction entries in the load queue when a cache line of the data cache addressed by the queued load instruction entry has been modified.

2. The load queue of claim 1 wherein when the executing load instruction is out of program order with respect to one of the queued load instructions, and the modified cache line register has marked the queued load instruction, the load queue signals an instruction fetch unit to cancel the queued load instruction.

3. The load queue of claim 1 further comprising an instruction identification buffer coupled to a sequencer unit for storing an instruction identifier for each entry in the load queue; and a program order comparator coupled to the instruction identification buffer for comparing ordering of instruction entries in the load queue with the executing load or store instruction.

4. The load queue of claim 3 wherein the cancelled queued load instruction returns to the load queue after re-execution.

5. The load queue of claim 1 wherein the load queue further receives a snoop real address signal from the data cache when a snoop occurs.

6. A method for detecting bypass errors in a load/store unit of a superscalar processor, the load/store unit including a load queue, the load queue including at least one load instruction entry, the method comprising:

comparing a real address to a word boundary of an executing load instruction and a real address to a word boundary of a queued load instruction;

comparing a program order of the executing load instruction and the queued load instruction when the real addresses to a word boundary match;

determining whether a bit for the queued load instruction has been set when the program order comparison indicates that the queued load instruction is executing out-of-order with respect to the executing load instruction; and cancelling the queued load instruction when the bit has been set.

7. The method of claim 6 wherein the bit is a modified cache line bit.

8. The method of claim 6 further comprising comparing a real address of a modified cache line to a real address of each load instruction entry in the load queue to a cache line boundary.

9. The method of claim 8 further comprising setting the bit for each load instruction entry having a real address that resides in the modified cache line.

10. A method for maintaining data coherency in an out-of-order execution of load instructions, the method comprising:

detecting a bypass error condition to a word boundary for a first load instruction executing out-of-order with respect to at least one second load instruction; and cancelling the first load instruction when the bypass error condition is detected in order to maintain data coherency.

11. The method of claim 10 wherein detecting a bypass error condition further comprises the step of comparing a real page number of an executing load or store instruction and a real page number of a queued load instruction.

12. The method of claim 11 further comprising comparing a program order of the executing load or store instruction and the queued load instruction when the real page numbers match.

13. The method of claim 12 further comprising determining whether a modified cache line bit for the queued load instruction has been set when the program order comparison indicates that the queued load instruction is executing out-of-order with respect to the executing load instruction.

14. The method of claim 10 further comprising comparing a page offset to a word boundary of an executing load or store instruction and comparing a page offset of a queued load instruction.

* * * * *